Figure 1:
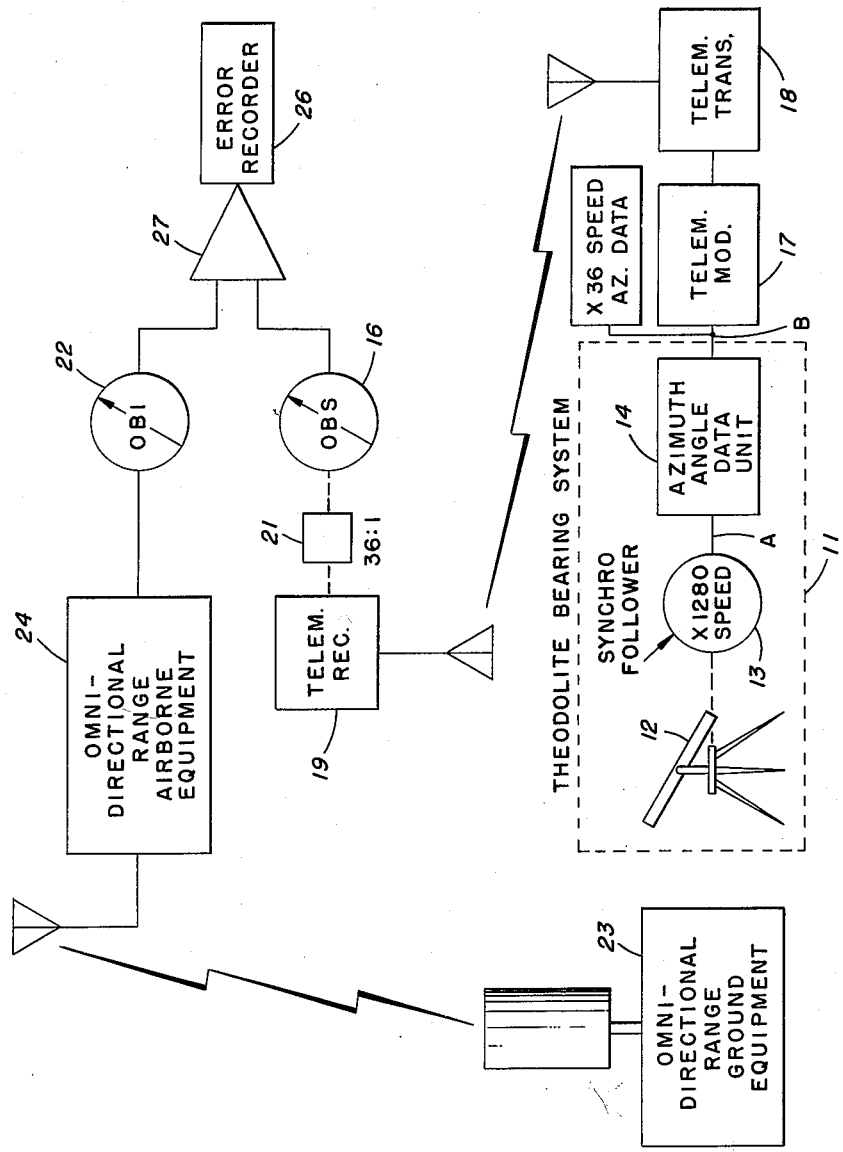

THEODOLITE BEARING SYSTEM WITH
OFFSET CORRECTION

THEODOLITE BEARING SYSTEM WITH
AIDED TRACKING

THEODOLITE BEARING SYSTEM WITH
OFFSET CORRECTION & AIDED TRACKING

United States Patent Office 2,982,958
Patented May 2, 1961

2,982,958
METHODS AND MEANS FOR MEASURING VARIOUS ERRORS IN GROUND REFERENCE AIR NAVIGATION SYSTEMS AND EQUIPMENT
Carlo Yulo, Apt. 2B Glendale Manor, Pleasantville, N.J.; Walter A. Martin, Jr., Hollywood, Md. (1528 Woode Lynn Blvd., Linwood, N.J.); and De Witt T. Latimer, Jr., Lexington Park, Md. (9527 5th Ave., Inglewood, 4, Calif.)
Filed May 9, 1956, Ser. No. 583,886
11 Claims. (Cl. 343—106)
(Granted under Title 35, U.S. Code (1952), sec. 266)

The invention described herein may be manufactured and used by or for the Government of the United States of America for governmental purposes without the payment of any royalties thereon or therefor.

The present invention relates generally to methods and means for measuring various errors in ground reference air navigation systems and more particularly to methods and means for determining azimuth errors in TACAN (Tactical Air Navigation), VOR (Very High Frequency Omni-Directional Range), and other omni-directional range systems and equipment. The determination of such errors is necessary for the evaluation of and the establishment of operating criteria for such systems and equipment.

The overall azimuth errors in omni-directional range type ground reference air navigation systems may be considered as consisting largely of the sum of the following component errors:

(1) Errors caused by terrain and atmospheric conditions which affect propagation between the ground antenna and the airborne antenna. This error may be termed site error.
(2) Errors caused by airborne equipment.
(3) Errors caused by ground equipment.

In order to facilitate corrective action, it is desirable to employ an error measurement system capable of properly dividing the overall error among the three groups named. Known measuring systems, in addition to other disadvantages, are incapable of so dividing the measured error.

One presently used system for measuring bearing or azimuth errors in TACAN and VOR systems involves recording the output of the pilot's course deviation (cross pointer) indicator as the aircraft orbits the ground station. The actual bearing of the aircraft is determined at regular angular intervals at the ground station by optical or other suitable means and relayed to the aircraft over a radio relay link to be there recorded as side marks along with the indicated bearing. The bearing or azimuth error is determined by comparing the recorded indicated and actual bearing information. Since the bearing of the aircraft with respect to the ground station is constantly changing and the course deviation indicator only covers a small preset azimuth section, it is necessary, in order to keep the indicator on scale to frequently, manually reset the pilot's course selector. As a result of this requirement, the record of indicated bearing is discontinuous during the times required to reset the course selector. Thus, it is not possible to obtain a complete set of data for each orbit of the aircraft. Another disadvantage of this method is that the recorded error is the total or overall system error. The data recorded thus gives no indication as to the cause or causes of the measured errors.

The error measuring methods and means of the present invention overcome these disadvantages in a manner which will be hereinafter fully described.

It is therefore a principal object of the present invention to provide methods and means for measuring errors in ground reference air navigation systems and equipment which provide data in a form that facilitates analysis of the measured errors.

It is a further and more specific object of the present invention to provide methods and means for measuring azimuth errors in ground reference air navigation systems such as TACAN, VOR, or other omni-directional range systems, which provide data in a form that facilitates analysis of the measured errors.

It is a further and still more specific object of the present invention to provide methods and means for determining azimuth errors in TACAN or VOR systems and equipment which provide data that is continuous and that indicates the cause or causes of error.

Figure 2:
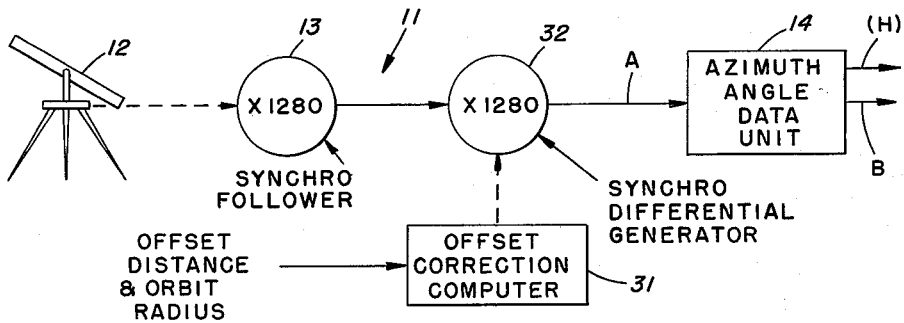
Figure 3:
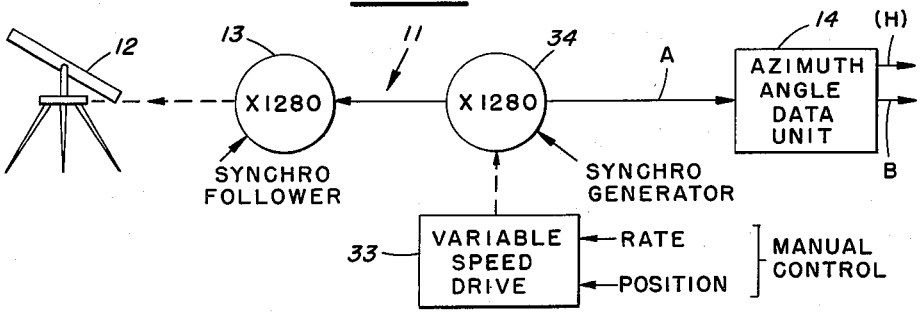
Figure 4:
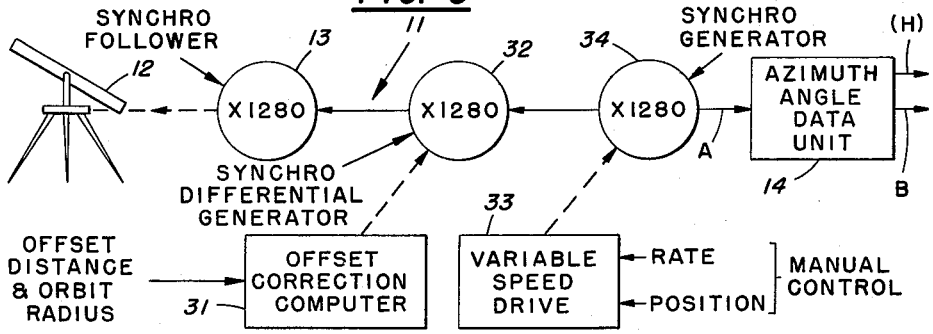
Figure 5:
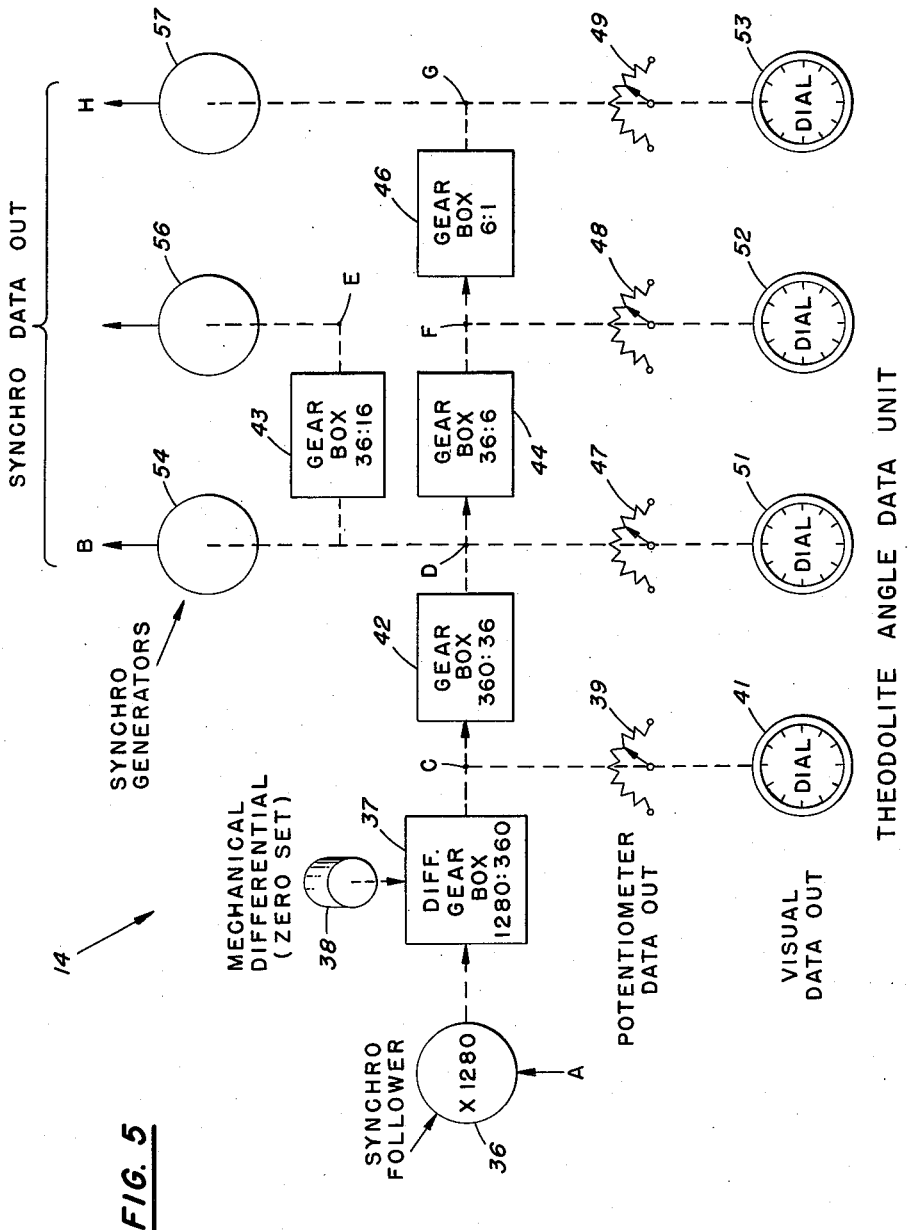

Other objects and many of the attendant advantages of the present invention will be readily appreciated as the same becomes better understood by reference to the following detailed description when considered in conjunction with the accompanying drawings wherein:

Fig. 1 is a schematic drawing illustrating a system for measuring and recording total system error according to the invention, Fig. 2 is a schematic drawing illustrating a modification of the theodolite bearing system of Fig. 1, Fig. 3 is a schematic drawing illustrating another modification of the theodolite bearing system of Fig. 1, Fig. 4 is a schematic drawing illustrating another modification of the theodolite bearing system of Fig. 1, Fig. 5 is a schematic drawing of the azimuth angle data unit shown in block diagram form in Figs. 1, 2, 3, 4 and 6.

Figure 6:
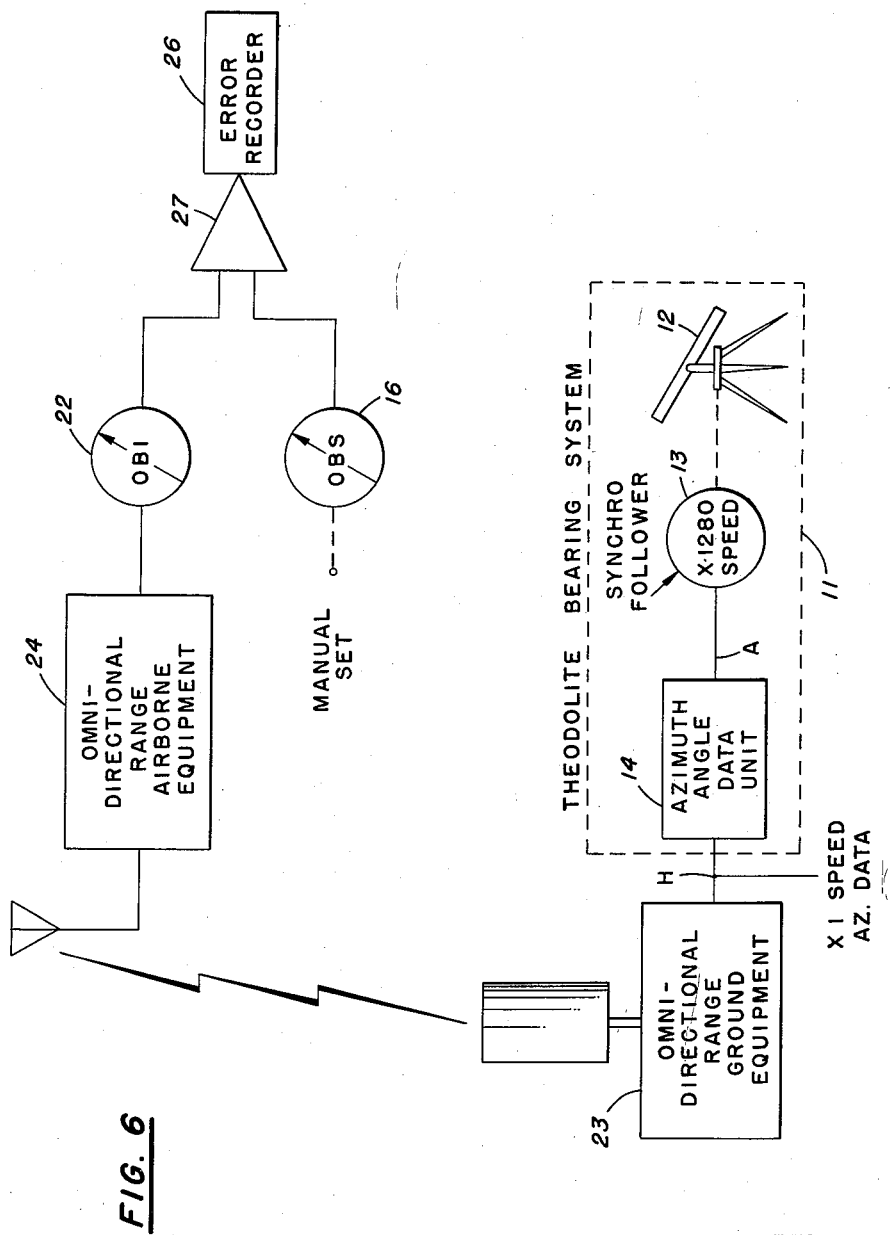
Figure 7:
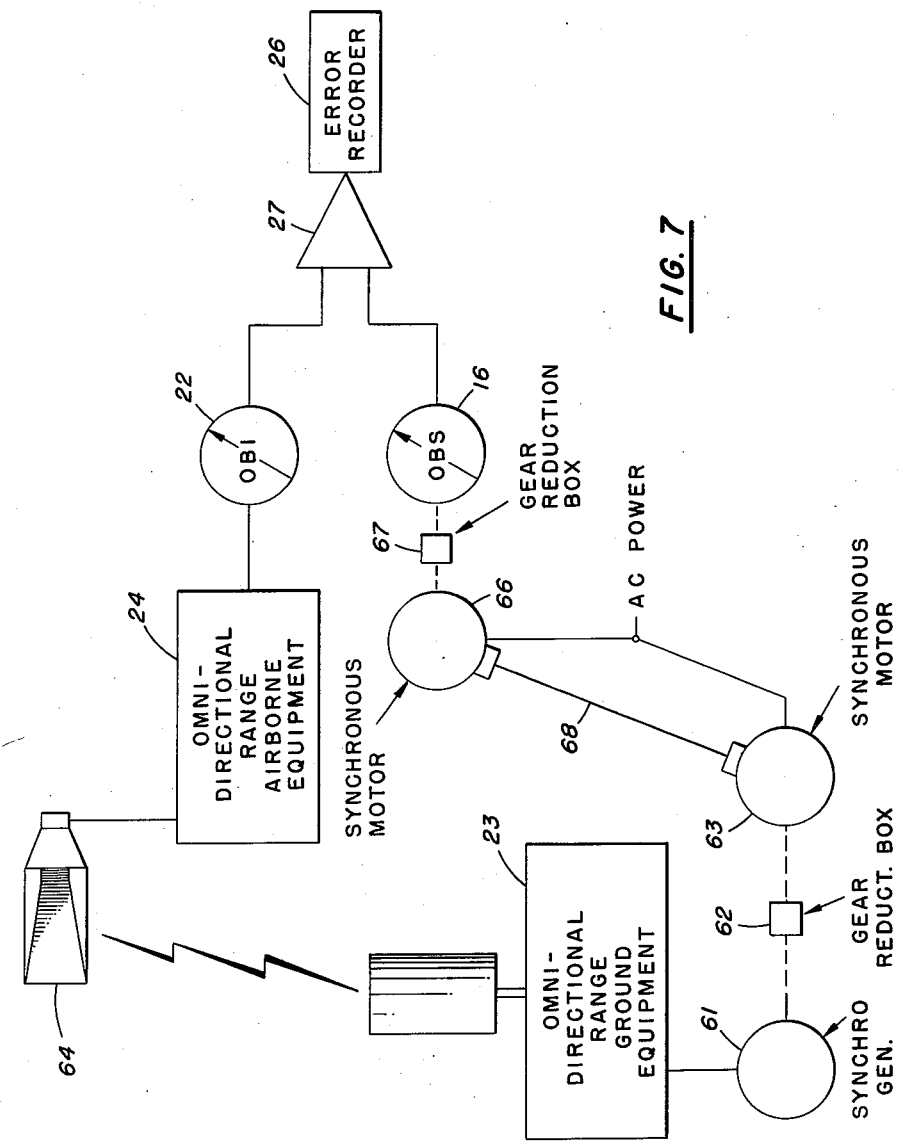
Figure 8:
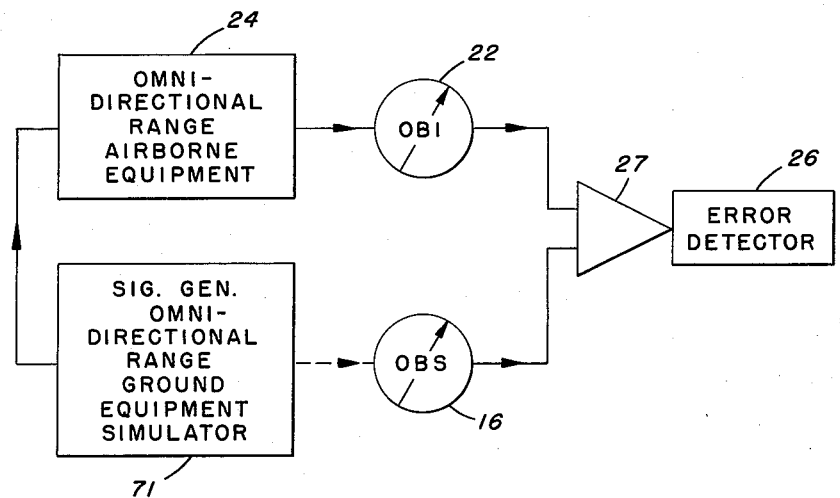
Figure 9:
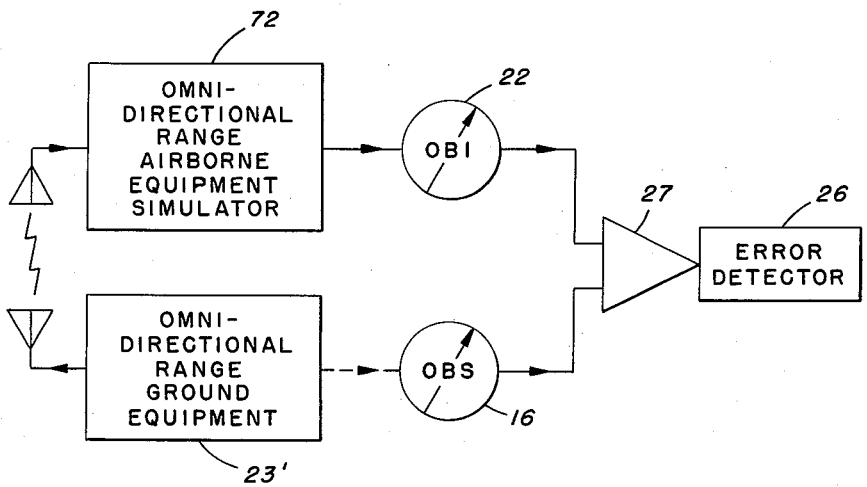

Fig. 6 is a schematic drawing illustrating a system for measuring and recording site error according to the invention, Fig. 7 is a schematic drawing illustrating a system for measuring and recording equipment error according to the invention, Fig. 8 is a schematic drawing illustrating a system for measuring and recording airborne equipment error according to the invention, and Fig. 9 is a schematic drawing illustrating a system for measuring and recording ground equipment error according to the invention.

Referring now to Fig. 1 there is shown a theodolite bearing system 11 comprising a theodolite 12 having a 1280 speed synchro follower 13 coupled to the azimuth axis thereof. Synchro follower 13 is coupled at A to an angle data unit 14 (to be later more fully described) which provides a 36 speed data output at B.

As an aircraft orbits a ground station, the true bearing of the aircraft with respect to the ground station is continuously determined by theodolite bearing system 11 and transmitted to the orbiting aircraft as 36 speed data via a radio relay link to continuously position the pilot's omni-bearing selector 16 (hereinafter abbreviated OBS). Thirty-six speed data is employed in order to minimize errors in the bearing measurement and data transmission systems. The radio relay link comprises a telemetering modulator unit 17, which may be a VOR simulator having the bearing selector thereof driven by the 36 speed data from azimuth angle data unit 14, a telemetering transmitter 18, and a telemetering receiver 19, which latter may be a VOR receiver which provides a continuous shaft output. OBS 16 is coupled to receiver 19 by a 36:1 reduction gear box 21.

Concurrently with the positioning of OBS 16, the pilot's omni-bearing indicator (OBI) 22 is positioned in accordance with the bearing signal transmitted by the ground station omni-directional range ground equipment 23, and received by the omni-directional range airborne equipment 24. A signal proportional to the differential positions of the OBI and the OBS shafts is supplied to an error recorder 26 through an amplifier 27. The error recorded is the total system error which includes site error, ground equipment error and airborne equipment error as discussed above.

The error signal to be recorded may be obtained in several ways, for example, the shafts of the OBI and the OBS may be coupled to a differential gearing mechanism the output shaft of which actuates a potentiometer wiper. Alternatively, the OBI and the OBS may be coupled to synchro generators which may in turn be coupled to an error detector to provide a D.C. recorder input signal having an amplitude proportional to the difference in phase of the signals from the OBI and OBS synchros.

While the theodolite bearing and telemetering systems described above will cause the shaft of OBS 16 to rotate in synchronism with theodolite 12 of theodolite bearing system 11, there will not necessarily be correspondence between the angular positions of the theodolite and the angular indications of the OBS. Accordingly, digital bearing information may be transmitted to the aircraft for each ten degrees of azimuth. This information operates a side marking pen to thus provide a reference for interpreting the recorded error.

Since theodolite 12 is located, in practice, at a distance from the antenna of ground equipment 23, it may be desirable to provide offset or parallax correction in bearing system 11.

Referring to Fig. 2, there is shown, in addition to theodolite 12, synchro follower 13, and azimuth angle data unit 14, an offset correction computer 31 coupled to a differential synchro generator 32. Offset correction computer 31 in response to input data comprising the distance between theodolite 12 and the antenna of ground equipment 23 and the orbit radius of the aircraft, provides, in the form of a shaft output, offset or parallax correction data. Differential synchro generator 32 accepts 1280 speed uncorrected bearing data from theodolite 12 and offset correction data from computer 31 and feeds 1280 speed offset corrected bearing data into azimuth angle data unit 14 at A. Angle data unit 14 provides offset corrected bearing data for transmission to the orbiting aircraft via a radio relay link as explained above.

Under some circumstances, for example, high aircraft speed or small aircraft orbit radius, it may be desirable to include in theodolite bearing system 11 provision for aided tracking. Accordingly, there is shown in Fig. 3 a manually controllable variable speed drive 33 that is conjointly coupled by a synchro generator 34 to theodolite 12 (through synchro follower 13) and to the input A of azimuth angle data unit 14. The coupling shown causes synchro follower 13 and a synchro follower in azimuth angle data unit 14 (not shown) to rotate in synchronism. In operation, the operator manipulates the controls of variable speed drive 33 to maintain the cross hairs of theodolite 12 centered on the orbiting aircraft.

Of course, as shown in Fig. 4, it may be desirable to provide, in theodolite bearing system 11 provision for both offset correction and aided tracking. Since the operation of the system of Fig. 4 will be obvious when reference is made to the description of the systems of Figs. 2 and 3 above, no detailed description of Fig. 4 will be given. It will be noted that, as in the system of Fig. 3, synchro generator 34 conjointly controls theodolite 12 and azimuth angle data unit 14. However, in the system of Fig. 4, since the coupling between synchro generator 34 and theodolite 12 includes differential synchro generator 32, the control which synchro generator 34 exercises over theodolite 12 will be modified by offset correction computer 31 to thereby provide the desired offset or parallax correction.

Referring now to Fig. 5, there is shown in detail the azimuth angle data unit 14 referred to above in the description of Figs. 1, 2, 3 and 4. A synchro follower 36 receives 1280 speed synchro data at A and provides a 1280 speed shaft output coupled to a 1280:360 reduction gear box 37 which may be controlled by a zero set device 38. Thus, 360 speed angle data is available for any desired purpose at C in the form of a shaft rotation. A potentiometer 39 may be provided if an electrical data output is desired. If in addition to or in place of an electrical output, a visual output is desired, a dial 41 may be provided. In like manner 36 speed data is available at D, via reduction gear box 42, 16 speed data at E, via reduction gear box 43, 6 speed data at F, via reduction gear box 44, and single speed data at G, via reduction gear box 46. In addition to or in place of the potentiometer and visual data outputs available at potentiometers 47, 48, 49, and at dials 51, 52, 53, if desired, synchro data outputs may be obtained by providing synchro generators 54, 56, 57. Only 36 speed and single speed synchro data, available at B from synchro generator 54 and at H from synchro generator 57, respectively, are required for the present invention.

There is shown in Fig. 6 a system for determining site error (plus constant equipment error). As explained above, site error consists of errors resulting from abnormalities in wave propagation between the ground station antenna and the airborne antenna due primarily to terrain and atmospheric conditions.

According to the invention, a single bearing signal is chosen and omni-bearing selector 16 is manually set to this bearing. As before, the actual bearing of an orbiting aircraft with respect to the ground station is continuously determined by theodolite bearing system 11. Single speed and/or thirty-six speed bearing data from azimuth angle data unit 14 is coupled to ground station equipment 23 to cause the azimuth reference system thereof to rotate in synchronism with theodolite 12 so that the selected bearing signal is continuously transmitted to the aircraft to there position omni-bearing indicator 22.

An error signal may be obtained in the form of a signal proportional to the differential positions of the shafts of OBS 16 and OBI 22 as explained above in the description of the system of Fig. 1 and applied to error recorder 26 via amplifier 27.

As in the system of Fig. 1, digital bearing information may be transmitted to the aircraft for each 10 degrees of azimuth to provide a reference to aid interpretation of the error record.

The system illustrated in Fig. 7 provides a direct, continuous, and dynamic record of overall equipment error (plus a constant site error).

A synchro generator 61, coupled through a reduction gear box 62, to a synchronous motor 63 causes the azimuth reference system of ground equipment 23 to rotate as a linear function of time.

Airborne equipment 24 is located at some fixed receiving point with respect to ground equipment 23 and is provided with a directional antenna 64 oriented toward ground equipment 23. OBS 16 is coupled to another synchronous motor 66 through a reduction gear box 67. A phasing link 68 may be provided between synchronous motors 63 and 66 if desired. OBI 22 is coupled to airborne equipment 24 as in the systems of Figs. 1 and 2.

The system described will cause OBS 16 to be rotated in synchronism with the azimuth reference system of ground equipment 23, and OBI 22 to be concurrently positioned in accordance with the radiated bearing signal received from ground equipment 23. The interval of time over which data is to be taken may be varied by manipulation of the gearing ratios of reduction gear boxes 62, 67 and the multiplying factor of synchro generator 61. The error is recorded as described above.

Comparison between the records of overall system error, site error, and overall equipment errors, as obtained by the systems of Figs. 1, 6 and 7, will permit division of the measured errors between site and equipment errors. In some cases it may be desirable to further divide equipment errors between airborne equipment errors and ground equipment errors. Accordingly, there are shown in Figs. 8 and 9 systems for determining airborne equipment errors and ground equipment errors, respectively.

Referring to Fig. 8, there is shown a signal generator 71 which includes an azimuth reference system rotated as a linear function of time to thereby simulate ground equipment 23. Signal generator 71 embodies a shaft output coupled to OBS 16 and an electrical output coupled to airborne equipment 24. OBI 22 is positioned in accordance with the output of airborne equipment 24 while OBS 16 is positioned in synchronism with the rotating azimuth system of signal generator 71. The error signal is obtained and recorded in the manner described above to provide a continuous record of airborne equipment error as a function of bearing or azimuth.

In Fig. 9 there is shown an omni-directional ground equipment 23' modified to provide a shaft output coupled to OBS 16 (in addition to an antenna output) and an omni-directional airborne equipment simulator 72 coupled to OBI 22. A signal proportional to the differential positions of the OBS and OBI shafts is obtained and recorded as described above to provide a continuous record of ground equipment error as a function of bearing or azimuth.

Comparison of the error records obtained by the systems of Figs. 1, 6, 7, 8 and 9 permits the measured errors to be apportioned as desired between site error, airborne equipment error, and ground equipment error.

Obviously many modifications and variations of the present invention are possible in the light of the above teachings. It is therefore to be understood that within the scope of the appended claims the invention may be practiced otherwise than as specifically described.

What is claimed is:

1. The method of determining overall system errors in a ground reference navigation system which comprises the steps of continuously determining the true bearing of an orbiting aircraft with respect to a ground station, continuously positioning a first indicator in said aircraft in accordance with said bearing, transmitting azimuth information determined by an azimuth reference system in said ground station to said aircraft, continuously positioning a second indicator in said aircraft in accordance with said azimuth information, and recording the difference in indications of said indicators.

2. The method of determining site errors in a ground reference navigation system which comprises the steps of continuously determining the true bearing of an orbiting aircraft with respect to a ground station, rotating an azimuth reference system in said ground station in accordance with said true bearing to track said aircraft and to transmit thereto a constant bearing signal, setting a first indicator in said aircraft in accordance with said transmitted constant bearing signal, continuously positioning a second indicator in said aircraft in accordance with said transmitted constant bearing signal, and recording the difference in indications of said indicators.

3. The method of determining equipment errors in a ground reference navigation system which comprises the steps of causing an azimuth reference system in a ground station equipment to rotate, transmitting a signal in accordance with said rotating azimuth reference system, positioning a first indicator in synchronism with said rotating azimuth reference system, positioning a second indicator in accordance with said transmitted signal, and recording the difference in indications of said indicators.

4. The method of determining airborne receiver equipment error in a ground reference navigation system which comprises the steps of positioning a first indicator in response to operation of a ground equipment simulator, positioning a second indicator in said airborne equipment in accordance with a signal received from said ground equipment simulator, and recording the difference in indications of said indicators.

5. The method of determining ground equipment errors in a ground reference navigation system which comprises the steps of positioning a first indicator in response to operation of said ground equipment, positioning a second indicator in response to a signal received from said ground equipment by an airborne equipment simulator, and recording the difference in indications of said indicators.

6. The method of compiling data for the evaluation of and the establishment of operating criteria for a ground reference navigation system which comprises the steps of determining the overall system error, determining site error independent of repeatable equipment error, and determining equipment error substantially independent of site error.

7. The method of compiling data for the evaluations of and the establishment of operating criteria for ground reference air navigation systems which comprises the steps of determining the overall system error, determining site error substantially independent of equipment error, determining airborne equipment error independent of site error and ground equipment error, and determining ground equipment error substantially independent of site error and independent of airborne equipment error.

8. A system for determining errors in a ground reference air navigation system comprising: means for generating and transmitting a rotating azimuth reference signal, airborne means for receiving said reference signal, a first indicator coupled to said receiver means and positioned in accordance with said reference signal, means for continuously determining the true bearing, with respect to said generating and transmitter means, of an aircraft containing said airborne means, means for generating an analogue voltage proportional to said true bearing, means coupled to said analogue voltage generating means for transmitting a signal in accordance with said analogue voltage, means in said aircraft for receiving said analogue voltage signal, second indicator means coupled to said receiving means and positioned in accordance with said true bearing, and means to record the difference in indications of said indicators.

9. A system for determining errors in a ground reference air navigation system comprising: means for determining the true bearing of an aircraft, means for generating and transmitting a rotating azimuth reference signal, means coupling said bearing determining means to said signal generating and transmitting means so that only a selected azimuth reference signal is transmitted.

10. The system of claim 9 including an airborne receiver system and a first indicator coupled thereto to be positioned in accordance with said transmitted azimuth reference signal.

11. The system of claim 10 including a second indicator preset to a bearing corresponding to said selected azimuth reference signal and means for comparing and recording the difference in the indications of said indicators.

References Cited in the file of this patent

UNITED STATES PATENTS

| 1,854,066 | Robinson | Apr. 12, 1932 |
| 1,983,079 | Hansen | Dec. 4, 1934 |
| 2,027,528 | Hammond | Jan. 14, 1936 |
| 2,027,530 | Hammond | Jan. 14, 1936 |
| 2,063,534 | Wallace | Dec. 8, 1936 |
| 2,155,492 | Kemp | Apr. 25, 1939 |
| 2,472,535 | Jones | June 7, 1949 |
| 2,715,727 | Pickles | Aug. 16, 1955 |
| 2,814,546 | Nickel | Nov. 26, 1957 |

OTHER REFERENCES

De Faymoreau, Etienne, Experimental Determination of Tacan Bearing and Distance Accuracy, IRE Transactions on Aeronautical and Navigational Electronics, volume ANE-3, pp. 33–36, March 1956, IRE, New York, N.Y. Reprinted under same title in: Electrical Communication, vol. 33, No. 1, pp. 67–73, March 1956, ITT Corp., New York, N.Y.